US012731933B2

(12) United States Patent
Huang et al.

(10) Patent No.: US 12,731,933 B2
(45) Date of Patent: Sep. 8, 2026

(54) AUTOMATIC PLUG/UNPLUG LINE MECHANISM

(71) Applicant: WE SOLUTIONS TECHNOLOGY CO., LTD, Taoyuan City (TW)

(72) Inventors: Chung-Peng Huang, Taoyuan City (TW); Fang-Yi Lin, Taoyuan City (TW); Kuan-Lin Chen, Taoyuan City (TW); Chun-Ching Kuo, Taoyuan City (TW); Tzu-Yuan Yen, Taoyuan City (TW)

(73) Assignee: WE SOLUTIONS TECHNOLOGY CO., LTD, Taoyuan City (TW)

( * ) Notice: Subject to any disclaimer, the term of this patent is extended or adjusted under 35 U.S.C. 154(b) by 345 days.

(21) Appl. No.: 18/657,816

(22) Filed: May 8, 2024

(65) Prior Publication Data

US 2025/0253574 A1 Aug. 7, 2025

(30) Foreign Application Priority Data

Feb. 1, 2024 (TW) ................................ 113103902

(51) Int. Cl.
*H01R 13/28* (2006.01)
*H01R 13/639* (2006.01)

(52) U.S. Cl.
CPC ......... *H01R 13/28* (2013.01); *H01R 13/6395* (2013.01)

(58) Field of Classification Search
CPC .... H01R 13/28; H01R 13/6395; H01R 43/26; H01R 13/64; H01R 24/60; H01R 13/639; H01R 24/86; H01R 12/7005; H01R 13/2442; H01R 13/6272; H05K 7/1414
USPC .......................................................... 439/291
See application file for complete search history.

(56) References Cited

U.S. PATENT DOCUMENTS 10,135,178 B2 * 11/2018 Li .......................... H01R 13/28
10,255,952 B1 * 4/2019 Han ........................ G06F 1/187

FOREIGN PATENT DOCUMENTS

CN 209446723 U * 9/2019
CN 117254330 A * 12/2023 ............ H01R 43/26

* cited by examiner

*Primary Examiner* — Tulsidas C Patel
*Assistant Examiner* — Jeffrey Mountain

(57) ABSTRACT

An automatic plug/unplug line mechanism includes a base, an actuating slider, a first and second guiding block, and a swing arm. The base has a compression chamber connected with an actuating guide groove and a straight groove. A secondary guide groove is adjacent to the straight groove. The actuating slider has an extension section above an actuating section, and has a pushing portion between the actuating section and the extension section. The first guiding block is connected to the extension section. The second guiding block is connected to the elastic expansion module and has a guidance portion located in the secondary guide groove. The swing arm has a first pivot portion between a second pivot portion and a line connecting portion. The first pivot portion is pivotally connected to the first guiding block. The second pivot portion is pivotally connected to the second guiding block.

10 Claims, 7 Drawing Sheets

AUTOMATIC PLUG/UNPLUG LINE MECHANISM

CROSS-REFERENCE TO RELATED APPLICATION

This non-provisional application claims priority under 35 U.S.C. § 119(a) on Patent Application No(s). 113103902 filed in Taiwan, R.O.C. on Feb. 1, 2024, the entire contents of which are hereby incorporated by reference.

BACKGROUND OF THE INVENTION

1. Field of the Invention

The present disclosure relates to an automatic plug/unplug line mechanism, and in particular to an automatic plug/unplug line mechanism capable of interrupting or restoring an electrical connection between a plug and a line of an electronic device.

2. Description of the Related Art

In general, when a line of an electronic device is connected to a corresponding plug, an electrical connection is established so as to transmit or receive electrical signals to/from the electronic device via the plug.

BRIEF SUMMARY OF THE INVENTION

Maintenance or replacement operations of an electronic device installed in an apparatus are mostly performed manually or semi-manually. However, manual operations contain numerous issues such as a high error rate, poor operation efficiency, and high labor costs.

In view of the drawbacks of the prior art above, the present disclosure provides an automatic plug/unplug line mechanism, which can be installed adjacent to an electronic device and automatically plugs/unplugs a plug corresponding to the electronic device when maintenance or replacement of the electronic device is needed.

The directional or similar terms used throughout the present disclosure, for example, “front”, “back/rear”, “left”, “right”, “up/upper/top”, “down/lower/bottom”, “in/inner”, “out/outer”, and “side surface”, are primarily given with reference to the directions of the accompanying drawings. These directional or similar terms are intended to assist in describing and better understanding various embodiments of the present disclosure and are not to be construed as limitations to the present disclosure.

The quantifiers “a/an” or “one” used for the elements and components described throughout the present disclosure are merely for the ease of use and to provide common meanings of the scope of the present disclosure, and should be interpreted as “one” or “at least one” in the present disclosure. Moreover, the concept of a singular form also includes cases of plural forms, unless otherwise specified.

Similar terms including “join”, “combine”, “couple”, or “assemble” used throughout the present disclosure primarily include forms which can be separated without sabotaging the components or contain inseparable components once connected, and can be selected by a person skilled in the art according to materials or assembly requirements of the components to be connected.

To achieve the above and other objects, the present disclosure provides an automatic plug/unplug line mechanism including: a base, having a compression chamber in communication with an actuating guide groove and a straight groove, a secondary guide groove adjacent to the straight groove; an actuating slider, having an extension section located above an actuating section, and having a pushing portion located between the actuating section and the extension section, the actuating section located in the actuating guide groove, the extension section located in the straight groove, the pushing portion located in the compression chamber; a first guiding block, a first end of the first guiding block pivotally connected to the extension section, a second end of the first guiding block passing through and out of the base; an elastic expansion module, located in the compression chamber, a bottom of the elastic expansion module abutting against the pushing portion; a second guiding block, a first end of the second guiding block connected to the elastic expansion module, a second end of the second guiding block passing through and out of the base, a guidance portion located between the first end and the second end and located in the secondary guide groove; and a swing arm, having a first pivot portion, a second pivot portion and at least one line connecting portion, the first pivot portion located between the second pivot portion and the line connecting portion, the first pivot portion pivotally connected to the second end of the first guiding block, and the second pivot portion pivotally connected to the second end of the second guiding block.

In the automatic plug/unplug line mechanism described above, the base can have a base plate and a protection box. The compression chamber, the actuating guide groove, the straight groove, and the secondary guide groove are disposed at the base plate, and each of the actuating slider, the first guiding block, the elastic expansion module, and the second guiding block can be completely or partially accommodated in the protection box.

In the automatic plug/unplug line mechanism described above, the elastic expansion module can have a slider and an elastic body, the elastic body abuts against the slider, and an elastic deformation coefficient of the slider is far less than that of the elastic body.

In the automatic plug/unplug line mechanism described above, the second guiding block can be shaped as a straight rod and have the guidance portion that is protruding, a portion of the second guiding block shaped as a straight rod is located on a rear side of the base plate, and the guidance portion can be inserted into the secondary guide groove.

In the automatic plug/unplug line mechanism described above, the first guiding block is shaped as a straight rod and is located on a front side of the base plate.

In the automatic plug/unplug line mechanism described above, the straight groove has at least one narrow portion, a groove width of the narrow portion is less than those of other portions of the straight groove, and the groove width of the narrow portion is slightly larger than a width of the extension section.

Accordingly, in the automatic plug/unplug line mechanism of the present disclosure, by only actuating the actuating slider to move in one axial direction, the swing arm can be moved in conjunction to complete a composite operation of moving in two axial directions, such that the swing arm can be lifted horizontally and be flipped sideways. Moreover, by actuating the actuating slider in reverse, the swing arm can first perform an operation of flipping back and then moving downward, so as to plug the plug on the swing arm back into the corresponding electronic device. Thus, an apparatus installed with the automatic plug/unplug line mechanism can be quickly and conveniently operated for maintenance or replacement of the electronic device, providing excellent practicability.

DETAILED DESCRIPTION OF THE INVENTION

To facilitate understanding of the object, characteristics, and effects of the present disclosure, embodiments together with the attached drawings for the detailed description of the present disclosure are provided.

Figure 1:
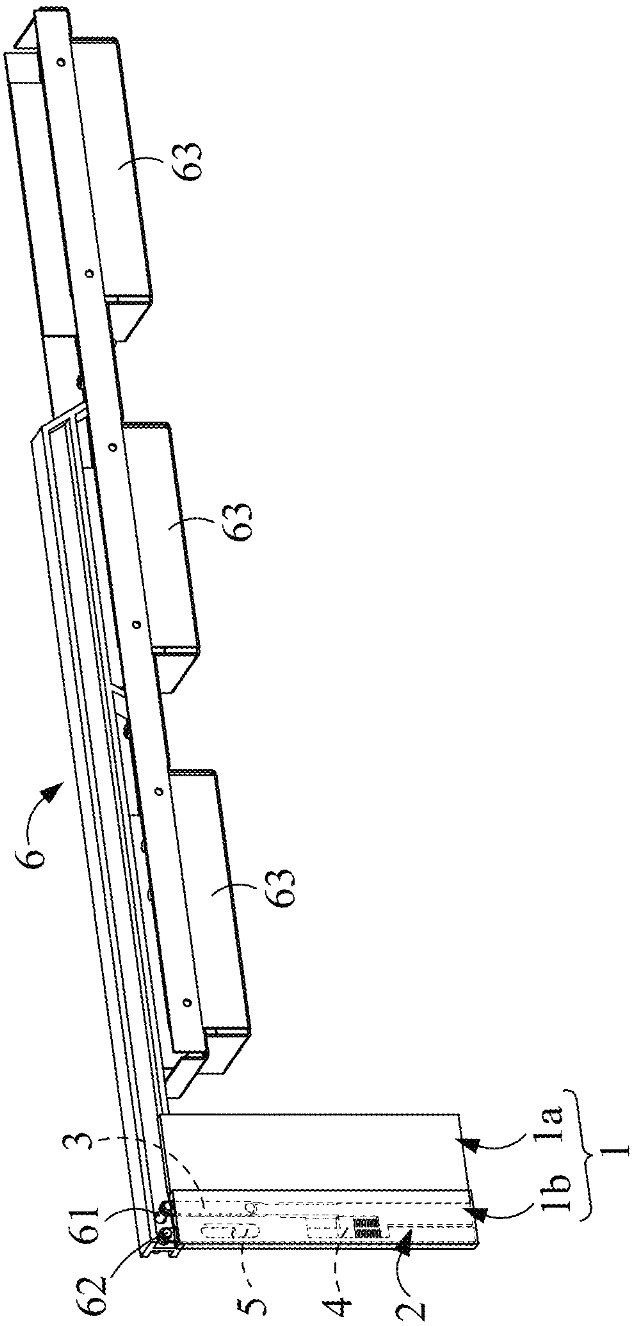
FIG. 1 is a perspective schematic diagram according to an embodiment of the present disclosure.
Figure 2:
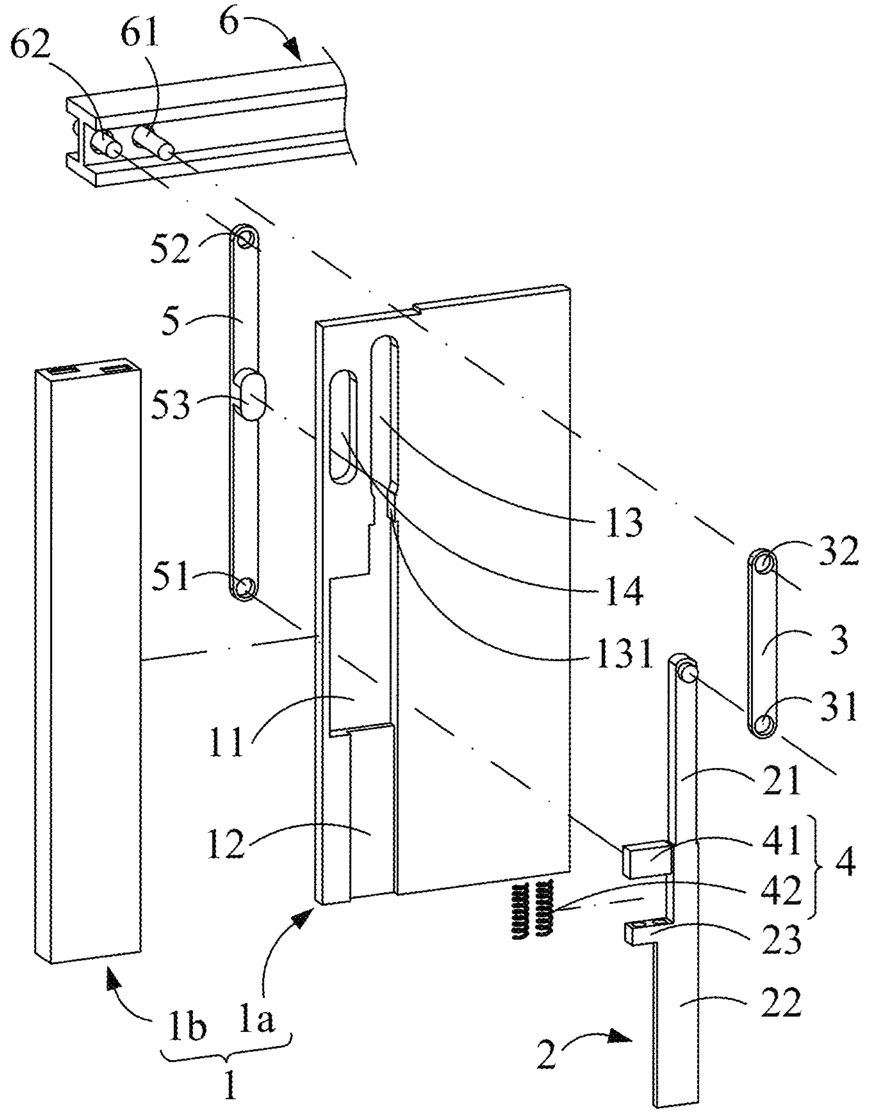
FIG. 2 is an exploded perspective schematic diagram according to an embodiment of the present disclosure.

Referring to FIG. 1 and FIG. 2, an automatic plug/unplug line mechanism according to a preferred embodiment of the present disclosure includes a base 1, an actuating slider 2, a first guiding block 3, an elastic expansion module 4, a second guiding block 5, and a swing arm 6. The actuating slider 2 and the elastic expansion module 4 are disposed at the base 1. The first guiding block 3 is pivotally connected to the actuating slider 2 and the swing arm 6. The second guiding block 5 is pivotally connected to the elastic expansion module 4 and the swing arm 6.

The base 1 has a compression chamber 11 in communication with an actuating guide groove 12 and a straight groove 13, and a secondary guide groove 14 adjacent to the straight groove 13. The actuating slider 2 has an extension section 21 located above an actuating section 22, and has a pushing portion 23 located between the actuating section 22 and the extension section 21. The actuating section 22 is located in the actuating guide groove 12, the extension section 21 is located in the straight groove 13, and the pushing portion 23 is located in the compression chamber 11. A first end 31 of the first guiding block 3 is pivotally connected to the extension section 21, and a second end 32 of the first guiding block 3 passes through and out of the base 1. The elastic expansion module 4 is located in the compression chamber 11, and a bottom of the elastic expansion module 4 abuts against the pushing portion 23. A first end 51 of the second guiding block 5 is connected to the elastic expansion module 4, and a second end 52 of the second guiding block 5 passes through and out of the base 1. A guidance portion 53 is located between the first end 51 and the second end 52, and is located in the secondary guide groove 14. The swing arm 6 has a first pivot portion 61, a second pivot portion 62, and at least one line connecting portion 63. The first pivot portion 61 is located between the second pivot portion 62 and the line connecting portion 63 and is pivotally connected to the second end 32 of the first guiding block 3, and the second pivot portion 62 is pivotally connected to the second end 52 of the second guiding block 5.

Figure 3:
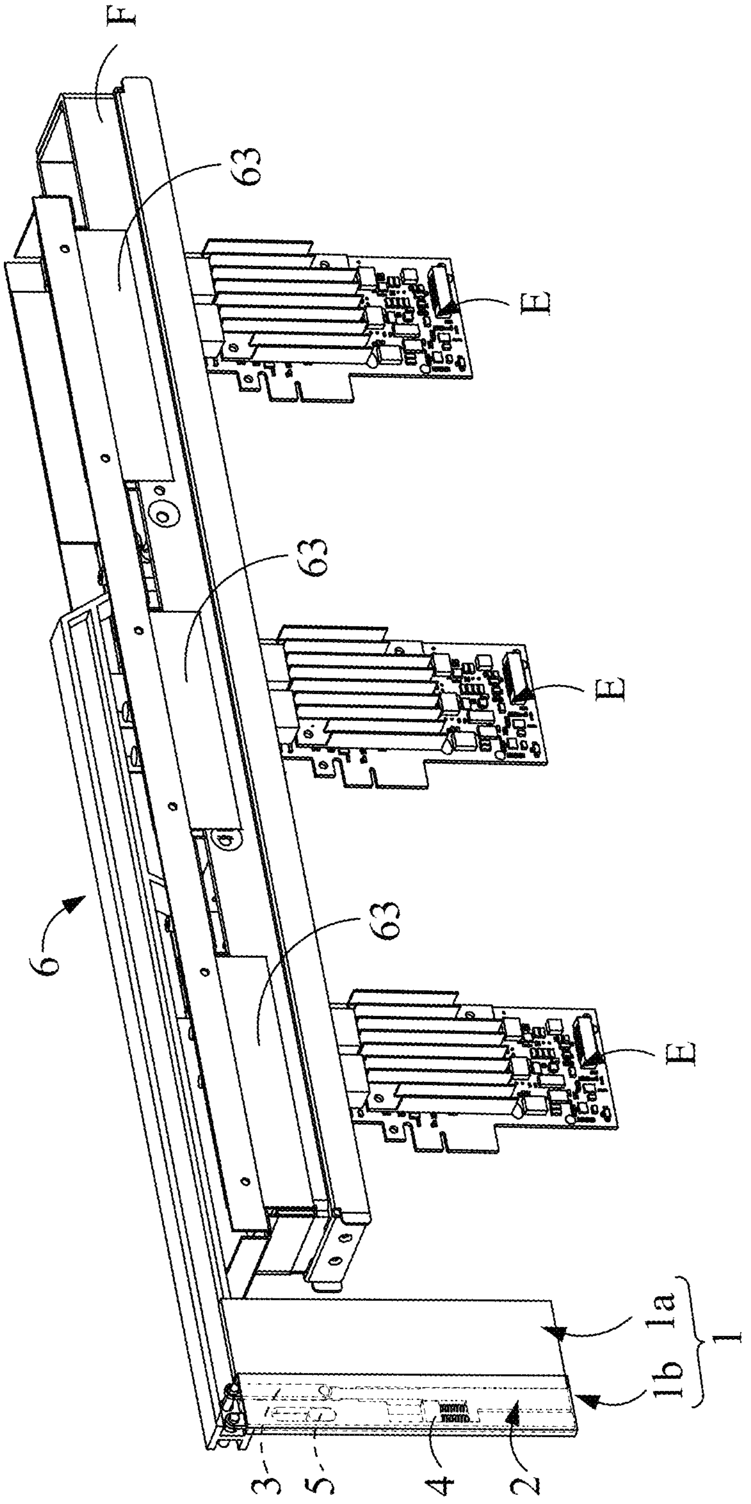
FIG. 3 is a perspective schematic diagram of a closed state so as to be in contact with an electronic device according to an embodiment of the present disclosure.

Referring to FIG. 3, the automatic plug/unplug line mechanism of an embodiment can be installed at a predetermined position of an apparatus, and be located on a side end of at least one electronic device E in the apparatus. For example, in the swing arm 6 of an embodiment, the line connecting portion 63 can be three in quantity, and so the automatic plug/unplug line mechanism can correspondingly manage electrical connection states of three electronic devices E. Each of the electronic devices E can be, for example but not limited to, an interface card or a hard drive, and the electronic devices E can be linearly spaced apart and mounted on a frame F in the apparatus. Thus, each of the line connecting portions 63 can include a plug P in a corresponding form according to the electronic device E with which it is aligned (shown in FIG. 7). Moreover, the apparatus is further installed with an actuator (not shown in the drawing). The actuator can be directly or indirectly connected to the actuating section 22 of the actuating slider 2.

Figure 4:
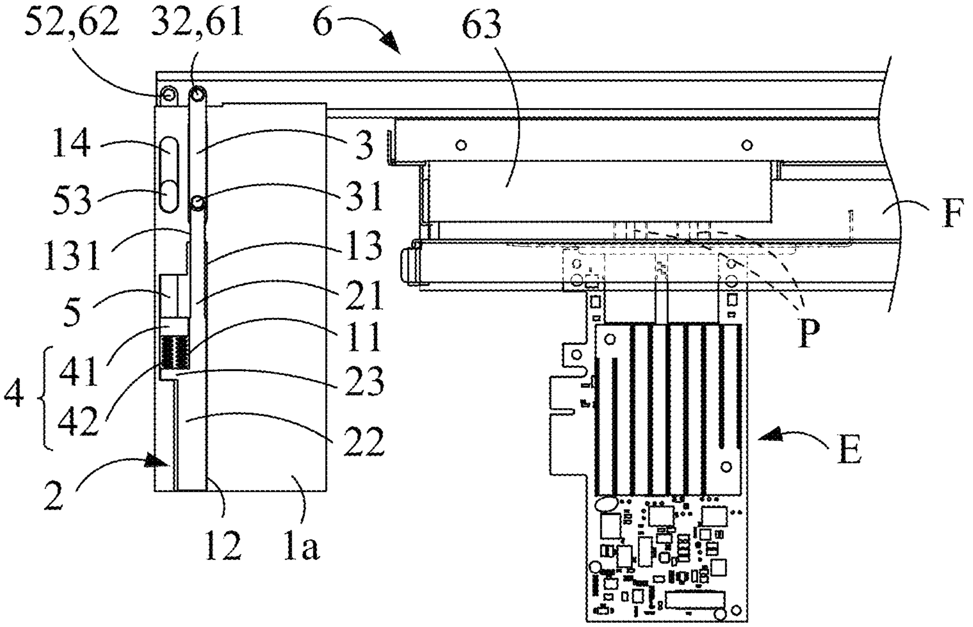
FIG. 4 is a partial front schematic diagram in a closed state with a protection box of the base omitted therefrom according to an embodiment of the disclosure.

Accordingly, referring to FIG. 2 to FIG. 4, when the automatic plug/unplug line mechanism of an embodiment is in a closed state, the actuating section 22 of the actuating slider 2 is located at a first position in the actuating guide groove 12, the extension section 21 is located at a first position in the straight groove 13, and the pushing portion 23 is located at a first position in the compression chamber 11. The first pivot portion 61 of the swing arm 6 is located at a first position and is aligned with a top of the straight groove 13, such that the first guiding block 3 can form an upright state. The elastic expansion module 4 is not yet subject to a force of action that causes an elastic deformation thereof. The guidance portion 53 of the second guiding block 5 is located at a first position in the secondary guide groove 14. The swing arm 6 is in a horizontally placed state, so that the plug P of the line connecting portion 63 can be electrically connected with the corresponding electronic device E.

Figure 5:
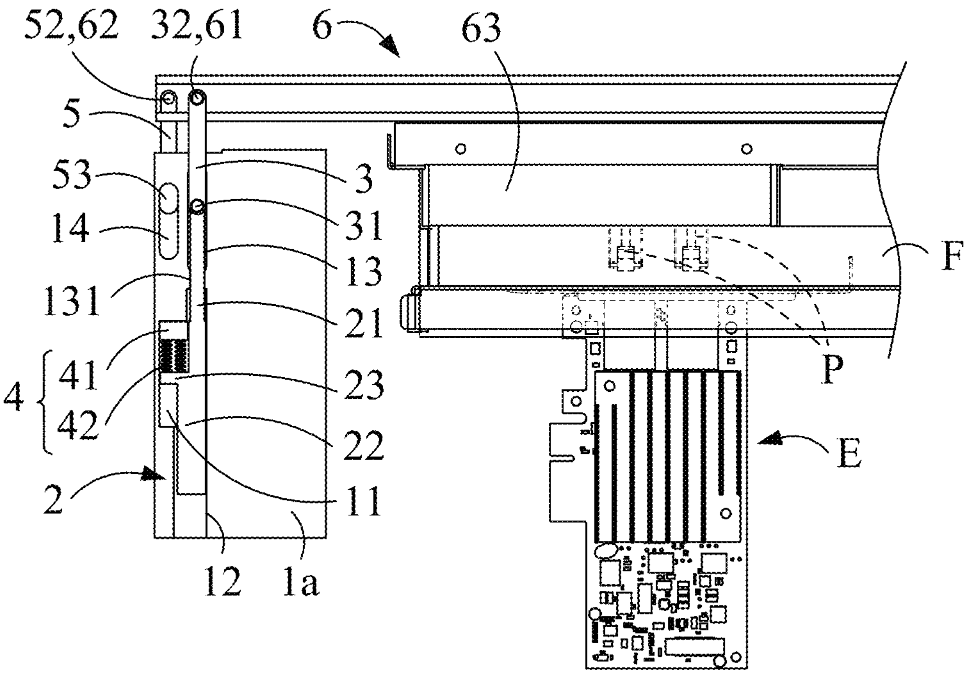
FIG. 5 is a partial front schematic diagram in a lifted state with a protection box of the base omitted therefrom according to an embodiment of the disclosure.

Referring to FIG. 2 and FIG. 5, to use the automatic plug/unplug line mechanism of an embodiment for automatically releasing the electrical connection between the corresponding plug P and electronic device E, the actuator can drive the actuating section 22 to move upward, such that the extension section 21 moves to a second position in the straight groove 13, the pushing portion 23 and the elastic expansion module 4 move to a second position in the compression chamber 11, and at the same time the guidance portion 53 of the second guiding block 5 moves in conjunction to a second position in the secondary guide groove 14. With guidance of the straight groove 13, the extension section 21 can drive the first guiding block 3 to lift in a straight line. With the secondary guide groove 14, the guidance portion 53 of the second guiding block 5 can be guided and lifted in a straight line, such that the entire second guiding block 5 is also lifted in a straight line. Thus, the second end 32 of the first guiding block 3 and the second end 52 of the second guiding block 5 can simultaneously move upward, so as to lift, for example, by 15 mm, the swing arm 6 and kept in a horizontally placed state. Thus, the automatic plug/unplug line mechanism is switched to a lifted state, and the plug P of the line connecting portion 63 is separated from the corresponding electronic device E, so as to release the electrical connection.

Figure 6:
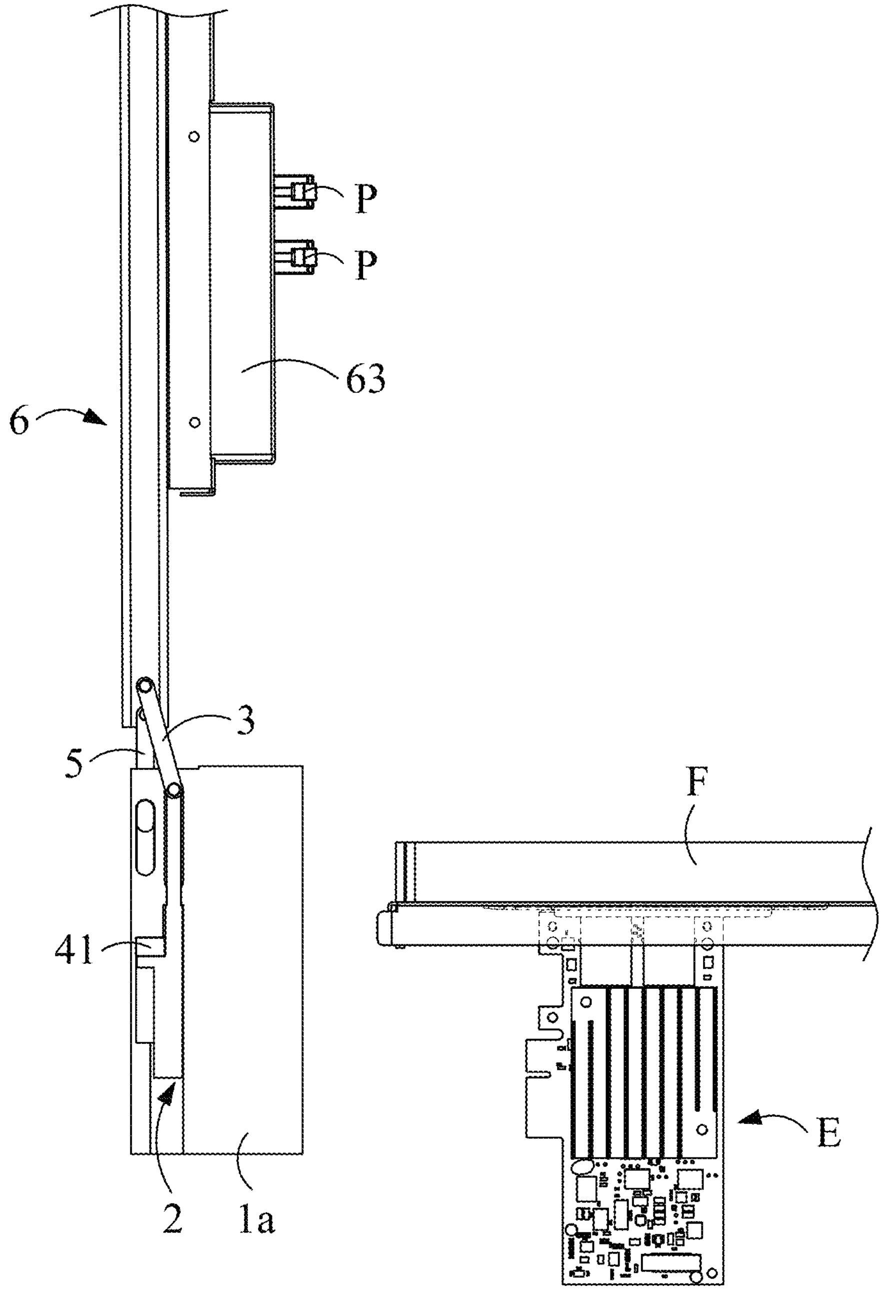
FIG. 6 is a partial front schematic diagram in an opened state with a protection box of the base omitted therefrom according to an embodiment of the disclosure.
Figure 7:
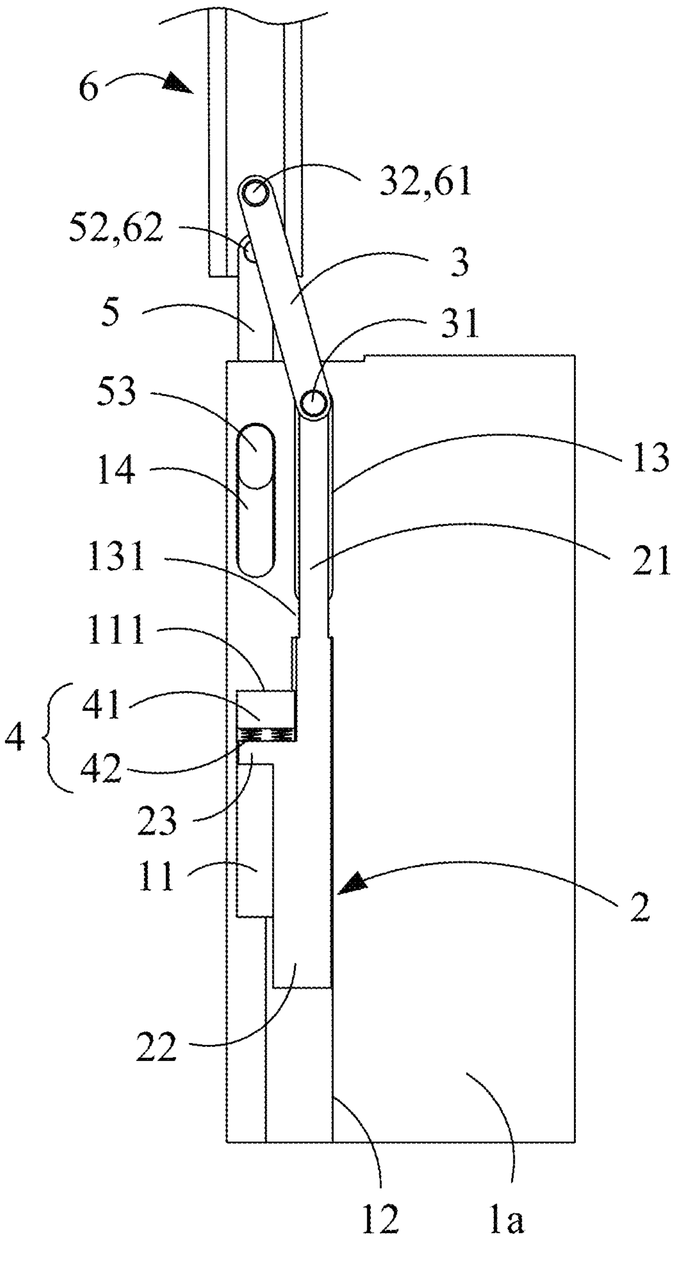
FIG. 7 is a partial enlarged diagram of FIG. 6.

Referring to FIG. 6 and FIG. 7, when the automatic plug/unplug line mechanism is switched to the lifted state, the actuator remains able to continuously drive the actuating section 22 to move upward. During a lifting process of the pushing portion 23, the pushing portion 23 can continuously lift after the elastic expansion module 4 abuts against a top surface 111 of the compression chamber 11, enabling the elastic expansion module 4 to generate an elastic deformation for energy storage. On the other hand, the continuously lifted actuating section 22 is also in conjunction with the first guiding block 3 to cause the first guiding block 3 to continue to move upward. However, the second guiding block 5 stops moving upward while the elastic expansion module 4 generates the elastic deformation. Moreover, since the second end 32 of the first guiding block 3 and the second end 52 of the second guiding block 5 are pivotally connected to the swing arm 6, the continuously lifted actuating section 22 causes the first guiding block 3 to pivotally rotate relative to the base 1, and is in conjunction with the swing arm 6 to pivotally rotates about the second pivot portion 62 to which the second end 52 of the second guiding block 5 is pivotally connected, thereby generating an action causing the swing arm 6 to flip toward one side. Thus, the automatic plug/unplug line mechanism can switch to an opened state, so that the swing arm 6 does not block over the electronic device E, allowing the electronic device E to be withdrawn from the frame F for maintenance or replacement.

When the electronic device or a new electronic device is again installed back to the frame F, the actuator only needs to operate in a reverse order to drive the actuating section 22 to move downward, and the automatic plug/unplug line mechanism can then switch from the opened state to the lifted state and then switch back to the closed state. During the switching back to the closed state, the plug P installed at the line connecting portion 63 can be inserted into the corresponding electronic device E, so as to automatically complete the electrical connection.

In conclusion, in the automatic plug/unplug line mechanism of an embodiment, by actuating the actuating slider 2 to move in one axial direction, the swing arm 6 can be moved in conjunction to complete a composite operation of moving in two axial directions, such that the swing arm 6 can be lifted horizontally and be flipped sideways. Moreover, by actuating the actuating slider 2 in reverse, the swing arm 6 can first perform an operation of flipping back and then moving downward, so as to plug the plug P back into the corresponding electronic device E. Thus, an apparatus installed with the automatic plug/unplug line mechanism is capable of being quickly and conveniently operated for maintenance or replacement of the electronic device E, providing excellent practicability.

It should be noted that, accompanied with rapid increases in powers and heat flux densities of heating components of electronic elements related to computing in computers, immersion cooling is one of the most effective techniques to quickly reduce the amount of heat generated by electronic computing elements. In two-phase immersion cooling, phase change heat transfer is performed in an enclosed space of a cabinet, and a coolant (such as perfluoro-ketone approaching a boiling point of 50° C.) boils and becomes a gaseous coolant. The gaseous coolant is condensed through a condenser tube above, transforms back into a liquid and returns to a lower part. Thus, it is not necessary to provide additional resources or pump power for heat dissipation, an effect of coolant circulation is achieved. In the aim of global energy saving and reduction of carbon emissions, the two-phase immersion cooling can effectively reduce power consumption and carbon emissions of related industries.

During maintenance or element replacement of the two-phase immersion cooling device above, a switch or an upper lid of the cooling device that shall be airtight needs to be turned on or opened. At this point in time, a gaseous coolant originally in the device can easily diffuse into machine rooms, factory areas, or further disperse into the atmosphere, hence resulting in occupational safety hazards to personnel or even environmental pollution. Therefore, the applicant has previously developed an automatic maintenance device which utilizes robotic arms in conjunction with an automated guided vehicle (AGV), so as to completely automate element maintenance or replacement operations. At present, the automatic plug/unplug line mechanism above is further provided by the present disclosure, and is installed in a cabinet of a two-phase immersion cooling device. Once a switch is turned on or an upper lid is opened, the automatic plug/unplug line mechanism automatically performs an operation to release an electrical connection between the plug P and the electronic device E, so as to coordinate with the automatic maintenance device above to further enhance operation efficiency of automated maintenance or replacement for the electronic device E within the two-phase immersion cooling device, and to completely eliminate hazards or risks of exposure to chemicals from personnel.

Referring to FIG. 1 and FIG. 2, in addition to the embodiment above, in one embodiment of the present disclosure, the base 1 can have a base plate 1*a* and a protection box 1*b*. Each of the compression chamber 11, the actuating guide groove 12, the straight groove 13 and the secondary guide groove 14 can be recessed in the base plate 1*a* or pass through the base plate 1*a*. Each of the actuating slider 2, the first guiding block 3, the elastic expansion module 4 and the second guiding block 5 can be completely or partially accommodated in the protection box 1*b* and be protected by the protection box 1*b*, so that these components are not susceptible to collisions and to maintain smooth movement relationships. The forms of the base plate 1*a* and the protection box 1*b* are not specifically defined by the present disclosure, and can be modified to match space configuration requirements of an apparatus to which they are to be assembled. Moreover, the base plate 1*a* can pass through one side of the protection box 1*b* as shown in the drawing. Alternatively, in other embodiments, the base plate 1*a* can also be completely located in the protection box 1*b*; such is not defined by the present disclosure.

In addition to the embodiments above, in an embodiment of the present disclosure, the elastic expansion module 4 has a slider 41 and an elastic body 42. The elastic body 42 can be, for example, at least one spring or elastic block (for example, rubber block or silica gel block), and an elastic deformation coefficient of the slider 41 is far less than that of the elastic body 42. The elastic body 42 can abut against an upper part or a lower part of the slider 41; in this embodiment, the elastic body 42 abutting against the lower part of the slider 41 is exemplified, for example, but a reverse configuration can also be implemented. Thus, while the automatic plug/unplug line mechanism switches from the lifted state shown in FIG. 5 to the opened state shown in FIG. 6, the continuously lifted pushing portion 23 can cause and produce an elastic deformation of the elastic body 42 between the slider 41 and the pushing portion 23 after the slider 41 abuts against the top surface 111 of the compression chamber 11. If the elastic body 42 abuts against the upper part of the slider 41, the elastic deformation is produced between the top surface 111 of the compression chamber 11 and the slider 41. As such, the elastic expansion module 4 of this embodiment achieves functions required for motion transmission by a simple structure, and provides effects of being easy to manufacture and assemble.

Referring to FIG. 1 and FIG. 2, in an embodiment of the present disclosure, the second guiding block 5 can be shaped as a straight rod and has the guidance portion 53 that is protruding. A part of the second guiding block 5 shaped as a straight rod can be located on a rear side of the base plate 1*a*, and be inserted into the secondary guide groove 14 via the guidance portion 53. The first end 51 and the second end 52 of the second guiding block 5 are located on the rear side of the base plate 1*a*, and are respectively connected to the slider 41 of the elastic expansion module 4 and the second pivot portion 62 of the swing arm 6. As such, the second guiding block 5 of this embodiment achieves functions required for motion transmission by a simple structure, and provides effects of being easy to manufacture and assemble.

In an embodiment of the present disclosure, the first guiding block 3 can be shaped as a straight rod and is located on a front side of the base plate 1*a*. As such, the first guiding block 3 of an embodiment achieves functions required for motion transmission by a simple structure. Moreover, since no interference is generated with respect to the base plate 1*a* or the second guiding block 5 during pivotal rotation, effects of being easy to manufacture and assemble as well as enhanced operation smoothness are provided.

Referring to FIG. 2 and FIG. 7, in addition to the embodiments above, in an embodiment of the present disclosure, the straight groove 13 can have at least one narrow portion 131. A groove width of the narrow portion 131 is less than those of other portions of the straight groove 13, and is slightly larger than a width of the extension section 21 of the actuating slider 2. As such, the actuating slider 2 of this embodiment is, by the narrow portion 131, capable of keeping the extension section 21 to move more stably up or down in a linear manner in the straight groove 13 without becoming oblique easily, thereby more smoothly moving or flipping the first guiding block 3 in conjunction according to an expected path.

The present disclosure is described by way of the preferred embodiments above. A person skilled in the art should understand that, these embodiments are merely for illustrating the present invention and are not to be construed as limitations to the scope of the present disclosure. It should be noted that all equivalent changes, replacements and substitutions made to the embodiments are encompassed within the scope of the present disclosure. Therefore, the legal protection of the present disclosure should be defined by the appended claims and the scope of the claims should be in accordance with the broadest interpretation, so as to encompass all modifications, similar arrangements and processes.

What is claimed is:

1. An automatic plug/unplug line mechanism, comprising:

a base, having a compression chamber in communication with an actuating guide groove and a straight groove, and a secondary guide groove adjacent to the straight groove;

an actuating slider, having an extension section located above an actuating section, and having a pushing portion located between the actuating section and the extension section, the actuating section located in the actuating guide groove, the extension section located in the straight groove, and the pushing portion located in the compression chamber;

a first guiding block, a first end of the first guiding block pivotally connected to the extension section, and a second end of the first guiding block passing through and out of the base;

an elastic expansion module, located in the compression chamber, a bottom of the elastic expansion module abutting against the pushing portion;

a second guiding block, a first end of the second guiding block connected to the elastic expansion module, a second end of the second guiding block passing through and out of the base, a guidance portion located between the first end and the second end and located in the secondary guide groove; and a swing arm, having a first pivot portion, a second pivot portion and at least one line connecting portion, the first pivot portion located between the second pivot portion and the line connecting portion, the first pivot portion pivotally connected to the second end of the first guiding block, the second pivot portion pivotally connected to the second end of the second guiding block.

2. The automatic plug/unplug line mechanism according to claim 1, wherein the base has a base plate and a protection box, the compression chamber, the actuating guide groove, the straight groove and the secondary guide groove are disposed at the base plate, and each of the actuating slider, the first guiding block, the elastic expansion module and the second guiding block is completely or partially accommodated in the protection box.

3. The automatic plug/unplug line mechanism according to claim 2, wherein the elastic expansion module has a slider and an elastic body, the elastic body abuts against the slider, and an elastic deformation coefficient of the slider is far less than that of the elastic body.

4. The automatic plug/unplug line mechanism according to claim 3, wherein the second guiding block is shaped as a straight rod and has the guidance portion that is protruding, a portion of the second guiding block shaped as a straight rod is located on a rear side of the base plate, and the guidance portion is inserted into the secondary guide groove.

5. The automatic plug/unplug line mechanism according to claim 4, where in the first guiding block is shaped as a straight rod and is located on a front side of the base plate.

6. The automatic plug/unplug line mechanism according to claim 1, wherein the straight groove has at least one narrow portion, a groove width of the narrow portion is less than those of other portions of the straight groove, and the groove width of the narrow portion is slightly larger than a width of the extension section.

7. The automatic plug/unplug line mechanism according to claim 2, wherein the straight groove has at least one narrow portion, a groove width of the narrow portion is less than those of other portions of the straight groove, and the groove width of the narrow portion is slightly larger than a width of the extension section.

8. The automatic plug/unplug line mechanism according to claim 3, wherein the straight groove has at least one narrow portion, a groove width of the narrow portion is less than those of other portions of the straight groove, and the groove width of the narrow portion is slightly larger than a width of the extension section.

9. The automatic plug/unplug line mechanism according to claim 4, wherein the straight groove has at least one narrow portion, a groove width of the narrow portion is less than those of other portions of the straight groove, and the groove width of the narrow portion is slightly larger than a width of the extension section.

10. The automatic plug/unplug line mechanism according to claim 5, wherein the straight groove has at least one narrow portion, a groove width of the narrow portion is less than those of other portions of the straight groove, and the groove width of the narrow portion is slightly larger than a width of the extension section.

* * * * *